May 20, 1952　　　　　F. NOE　　　　　2,597,516

JOURNAL BEARING

Filed Aug. 28, 1948

INVENTOR
FRANK NOE
BY
*Mitchell Bechert*
ATTORNEYS

Patented May 20, 1952

2,597,516

UNITED STATES PATENT OFFICE 2,597,516

JOURNAL BEARING

Frank Noe, Plainville, Conn., assignor to The Fafnir Bearing Company, New Britain, Conn., a corporation of Connecticut Application August 28, 1948, Serial No. 46,584

10 Claims. (Cl. 308—180)

My invention relates to a railroad bearing and in particular to an antifriction bearing for adaptation to existing journal boxes.

In many railroad uses, as in freight cars, the application of antifriction bearings to replace plain bearings is handicapped by the design of the plain bearings. Often, the journal box is cast with one or two inwardly projecting lugs for axially locating the plain bearing, or brass. These lugs may project inwardly almost to the outside diameter of the journalled end of the axle, and it has proved difficult to adapt antifriction bearings to such journal boxes without replacing the journal box or substantially turning down the journal.

It is an object of the invention to provide an improved bearing of the character indicated.

It is another object to provide an improved antifriction bearing assembly that may be applied with a minimum of modification to existing journal boxes and axles.

It is a further object to provide an improved antifriction bearing assembly which may be applied in a journal box of the character indicated without requiring any reduction from standard journal diameter.

It is still another object to provide an improved antifriction bearing assembly for adaptation to existing axles and journal boxes and having inherently higher radial-load capacity than heretofore.

It is a specific object to provide an improved antifriction bearing-adapter assembly which may utilize existing journal-box lugs for the direct axial location of spaced sets of antifriction elements within the assembly.

It is another specific object to provide an antifriction bearing assembly for adaptation to existing journal boxes and axles, said assembly incorporating improved thrust-receiving means.

Other objects and various further features of the invention will be pointed out or will occur to those skilled in the art from a reading of the following specification. In the drawings, which show, for illustrative purposes only, a preferred form of the invention:

Figure 1:
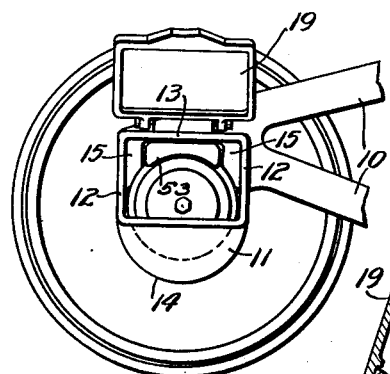
Fig. 1 is a fragmentary end view of a truck side frame that has been cast with an integral journal box, to which a bearing assembly incorporating features of the invention has been applied.

Briefly stated, my invention contemplates a unitary assembly of spaced sets of antifriction bearing elements which may be slidably inserted over the full-diameter of a standard cylindrical railway journal, the sets of antifriction elements being spaced on opposite sides of the locating lug or lugs of a standard journal-box. In the form to be described, the antifriction elements of each set ride on a common cylindrical surface within a housing member, and there is a slotted opening to this surface between the sets of bearings for reception of the journal-box housing lug. The housing member may extend beyond the end of the axle and may support antifriction thrust-bearing means to sustain end shocks of the axle.

Referring to the drawings, my invention is shown in application to a standard freight-car truck having side-frame members 10 cast integral with a journal-box 11. The box 11 may be characterized by generally flat side walls 12, by a generally flat upper wall 13, and by a generally semicylindrical bottom portion or wall 14. Integral with parts of the side and upper walls 12—13 may be a pair of locating lugs 15; and, in the standard sleeve-bearing application, the sleeve or brass is grooved for insertion upward in axial-retaining relation with these lugs 15. At the back end of the journal-box there may be one or more retaining webs or flanges 16—17 extending generally annularly about the axle 18 and for supporting suitable dust guards (not shown). The box may be closed by a hinged cover 19 for inspection and servicing.

In accordance with the invention, I provide an antifriction bearing assembly that may fit slidably over the journal 20 of a standard axle 18 and which may at the same time utilize the retaining lugs 15 of a standard journal-box 11. My novel assembly may be principally built around a housing member 21, which may have a cylindrical inner surface or counterbore 22 extending virtually the length of the journal end 20 of the axle 18. The surface 22 may be finished to serve as the outer raceway for two spaced sets of antifriction elements 23. The antifriction elements 23 are shown to be rollers and to be spaced and held by suitable retainer means 24. The retainer means 24 preferably axially overlaps the ends of the rolls 23 and may be of a one-piece bronze construction incorporating a plurality of roller-receiving pockets.

Figure 4:
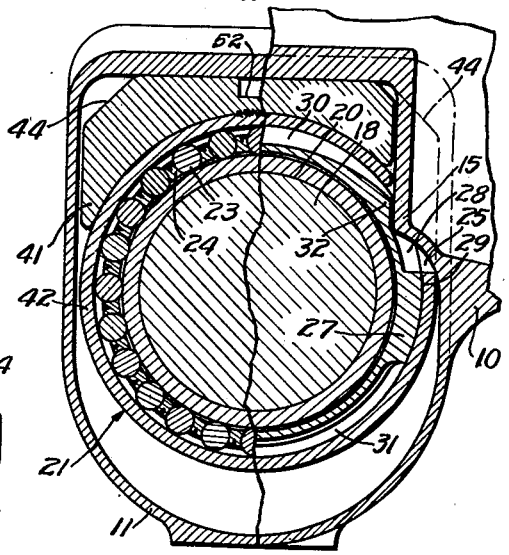
Fig. 4 is an enlarged sectional view taken in two sections; on the right side of Fig. 4 the section is taken in the plane A—A of Fig. 3, and on the left side of Fig. 4 the section is taken in the plane B—B of Fig. 3.

In order axially to locate the housing member 21 by means of the lugs 15, the member 21 may be formed with exterior cut-away portions, and in the form shown these cut-away portions are openings 25 from the surface 22 to the outside of the member 21. Since there are two lugs 15 in the journal-box under consideration, there may be two openings 25. The openings 25 preferably occur axially intermediate the adjacent ends of the retainer rings 24 for both sets of antifriction elements 23, and for positioning purposes a generally annular spacer member 27 may be positioned between the retainers of both sets of roller bearings. The spacer member 27 may also provide a means of sealing the interior of the bearing assembly against entry of dust and other foreign matter through the openings 25; to this end, there is preferably a sealing fit between spacer 27 and the housing member 21. In some heavy-duty applications, the spacer member 27 may be cut-away opposite the openings 25, as at 28, in order to receive the lugs 15 (see Fig. 4). With the spacer 27 thus cut-away there clearly need only be a sealing fit between spacer 27 and housing member 21 at the lower sides 29 of openings 25, and for the upper arcuate extent of end flanges 30 on spacer 27. For free distribution of lubricant to the two sets of radial bearings, I prefer that these flange portions 30 be cut-away below the point at which the seal of openings 25 is effected. With the flanges thus cut-away, it will be understood that a trough 31 may be formed to permit such free distribution of lubricants between the spaced sets of bearings. In order that the locating lugs 15 may positively hold the spacer member 27 against rotation, a built-out portion or abutment 32 may be formed in the spacer ring 27 at the upper part of the cut-away portion 28.

While in certain instances it may be desirable to have the sets of radial bearings ride directly on the axle, using the journal 20 as the inner race means, I prefer to employ separate inner race means appropriately matched to the antifriction elements. Such an inner race may be satisfactorily provided by a single sleeve 33 slidable over the journal 20 and providing inner raceway surfaces for both sets of radial bearings, as will be clear.

In order to absorb thrust in the bearing assembly shown, I prefer to employ separate antifriction thrust-bearing means which may be carried and located by the housing member 21. In the form shown, this thrust-bearing means utilizes a thrust-bearing comprising inner and outer race members 34—35 with antifriction elements therebetween. The inner race element may be generally cup-shaped and bear directly against the end of the axle 18, and the outer race element 35 may be slidably received in a bore 37 within the housing member 21. Resilient means, such as oppositely dished frusto-conical spring washers 38 may be interposed between the outer thrust ring 35 and an inwardly extending ledge of flange 39 of the housing member 21. A snap ring 40 in the bore 37 may serve to retain the assembly before application to an axle and journal-box. The thrust-bearing assembly shown is as described in further detail in the copending application of H. R. Reynolds, Serial No. 16,060, filed March 20, 1948, now Patent No. 2,593,919, dated April 22, 1952.

Figure 5:
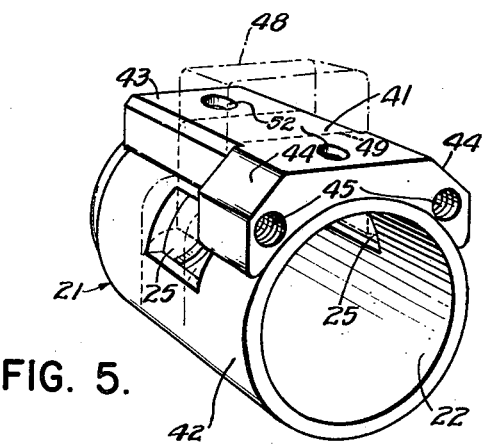
Fig. 5 is a view in perspective of a part of the bearing assembly of my invention.

The housing member 21 may be formed of two parts 41—42 which may be separately forged and welded together. The part 41 is shown as a saddle member and part 42 is tubular; the saddle 41 rides upon the tubular member 42 and may be secured by spot welds, as at the adjacent cross-shaded surfaces opposite recesses 52 in the top of the saddle 41. For a better distribution of thrust loads, and in order not to stress the welds unduly, the saddle 41 may be formed with a radial flange, as at 53, to engage the intermediate shoulder 54 of the tubular member 42. When finished, the housing member 21 may have the appearance shown in Fig. 5, which is a view looking more or less from the wheel side of the bearing and out toward the outer end. The upper exterior of housing member 21 is preferably characterized by an extended surface 43 which may be slightly arched in order rockingly to ride the inner surface of the upper journal-box wall 13. At the wheel end this upper part of the housing member 21 may be built out or enlarged, as at 44, to provide for axial abutment over an extended part of the journal-box lugs 15. If desired, these enlarged portions 44 may be drilled and tapped, as at 45, for the accommodation of securing means (not shown) for a water-and-dust seal member 46 of conventional construction. The complete housing 21 and, therefore, the antifriction bearing assembly may be sealed by an end plate 47 suitably secured to the flange 39.

Figure 3:
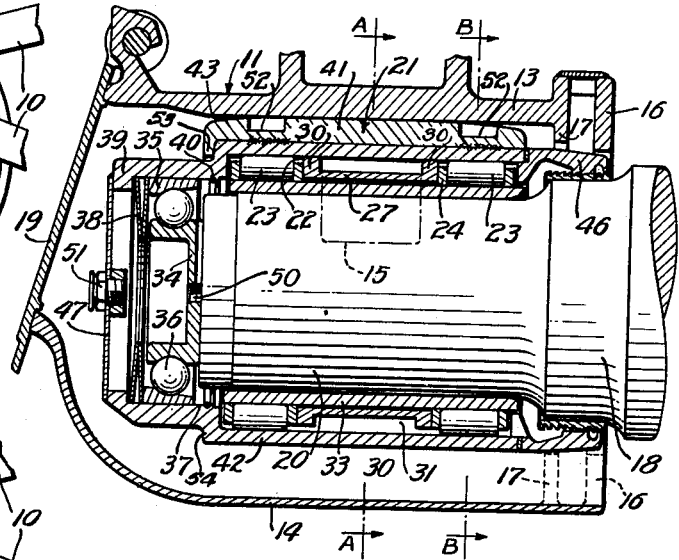
Fig. 3 is an enlarged vertical sectional view through the journal box and bearing assembly of Fig. 1.

In applying a bearing assembly of the character described to a standard journal-box, such as the journal-box 11, the only necessary change in the journal-box is to cut out (as with a gas torch or with an electric arc) parts of the dust-guard-retaining webs 16—17; in Fig. 3, the fact of this change has been noted by showing the lower parts of the webs 16—17 in dotted lines. The assembly is made by inserting the outer end of the bearing assembly through the wheel end of the journal-box, as by sliding the bearing assembly along the lower wall 14 of the journal-box. The journal-box lugs 15 cannot interfere with this insertion because the bearing housing member 21 is not built out forward of the openings 25. When axially inserted all the way, the shoulders or abutments 44 will engage the journal-box lugs 15, and the bearing assembly need only be raised relatively to the box for the lugs 15 to slide down into the openings 25 and cut-away portions 28.

Figure 2:
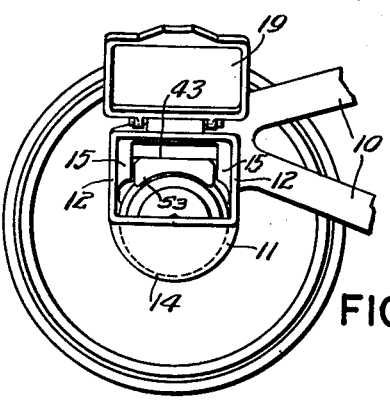
Fig. 2 is a view similar to Fig. 1, with a slightly different relationship of parts in order to illustrate a manner of assembling my improved bearing in a journal box.

In actual practice, that is, in replacing a standard plain bearing with my antifriction bearing assembly, my bearing assembly may first be mounted upon the journal end 20 of the axle 18. This may be accomplished by merely removing the brass-retaining flange at the end of the standard axle, and there need be no further turning down (that is, reduction in diameter) of the standard journal end. The side frame of the truck may then be jacked up, so as to permit the endwise insertion depicted in Fig. 2. At this time, the journal-box lugs 15 and the space between them will be in the relative position indicated by the dot-dash outlines 48 of Fig. 5. Upon release of the jack, the bearing assembly will be adequately retained and located in the journal-box, as indicated by the dotted outlines 49 of Fig. 5. It will be understood, of course, that in accordance with installation practice involving spring - loaded thrust-bearings, a screw jack may be inserted through the lubricant-filler hole of the end plate 47 and engaged with the threaded hole 50 of the inner thrust-ring 34 in order to compress the spring 38 during the assembly; upon assembly, the jack may be removed, and a lubricant fitting 51 may be applied to the cover plate 47.

It will be appreciated that I have described an ingenious bearing assembly for particular use in adapting antifriction bearings to certain conventional railway axles and journal-boxes. The assembly is adaptable with a minimum of cutting of the standard parts, and, more important, the assembly permits use of relatively large high-radial-load capacity antifriction elements; in fact, it will be noted that both sets of spaced antifriction elements 23 may ride upon an outer race of radius exceeding the shortest radial distance of lugs 15 to the axis of the bearing. The unique manner of allowing the lugs 15 to project into the interior of the bearing assembly means not only good axial location of the assembly but also positive location (angular and axial) of the spacer and seal ring 27. If desired, the spacer ring 27 may be of hardened material to reduce wear at contact with lugs 15 and to provide good and lasting abutment faces for contact with the retainers 24, which are preferably of bronze construction.

While I have described my invention in detail for the preferred form shown, it will be understood that modifications may be made within the scope of the invention as defined in the appended claims.

I claim:

1. In a bearing for use in a journal-box housing having an inwardly projecting axial locating lug, a circumferentially continuous bearing housing member to be received in said box and having a groove to receive the lug, whereby said housing member may be axially located by said lug, and spaced two sets of antifriction elements to ride within said housing member, said housing member having a continuous longitudinally extensive bore providing common raceway support for both said sets of antifriction elements, there being a certain amount of axial freedom for axial sliding relative movement of said sets of rollers with respect to said housing member, the maximum raceway radius for said elements exceeding the shortest radial distance of the lug to the bearing axis, whereby such a lug may serve directly to limit axial movement of said sets of elements independently of housing-member location.

2. In a bearing of the character indicated, a generally annular member with an inner cylindrical surface to fit a railway axle, a pair of spaced sets of antifriction rollers riding on the outside of said annular member, a housing member including a single cylindrical inner surface forming a raceway for each of said sets of rollers and having a slotted opening intermediate said sets of rollers for reception of a locating lug of a journal box, and sealing means carried by said housing member and located for axial interposition between each said set of antifriction rollers and the respective axial ends of the locating lug.

3. In a bearing for use in a journal box having an inwardly projecting axial locating lug, a housing member having a cylindrical inner surface and an opening from said surface to the outside of said housing for the locating reception of such a lug, two sets of antifriction rollers riding upon said surface as an outer raceway and located on opposite sides of said opening, there being a certain amount of axial freedom for axial sliding movement of said sets of rollers with respect to said housing member, said housing member being sufficiently thin so that such a lug may project radially inwardly of said surface, whereby such a lug may directly serve to limit axial movement of said sets of rollers, thrust-bearing means supported at one end of said housing member for abutment with an axle end, and spring means resiliently urging said thrust-bearing means for constant abutment with the axle end.

4. A bearing according to claim 3, in which said thrust-bearing means includes inner and outer race members with antifriction elements therebetween, said inner race member being positioned for abutment with the end of the axle to be supported in said bearing, said spring means exerting axial thrust on said outer race member relatively to said housing member.

5. An antifriction bearing assembly for adaptation to journal boxes having an inwardly projecting axial locating lug and for adaptation to an axle having a straight cylindrical journal, comprising a longitudinally extending housing member with a cylindrical inner surface having a radial opening to the outside of said member for reception of the lug, a generally annular sealing member within said surface and effectively closing said opening to the interior of said housing member, two sets of antifriction rollers located respectively at opposite sides of said sealing member and utilizing said surface as an outer raceway, said sealing member serving as an axle spacer for said sets of roller elements, each of said sets of roller elements including retainer means retaining said rollers on said outer raceway, whereby on assembly of said housing member said roller elements and said spacer means may be axially inserted over the end of an axle and then raised in axial locking engagement with the lug of a journal box.

6. A bearing according to claim 5, in which said sealing member has an outer cut-away portion to be positioned opposite the opening in said housing member, whereby a journal-box housing lug may project through said opening and into locating engagement with said sealing means, whereby said sets of roller elements may always be positively located with respect to the journal box and yet there may be a certain axial freedom of an axle relative to the bearing assembly.

7. In a bearing of the character indicated, a housing member with an external cut-away portion to engage a journal-box housing lug, said member having a cylindrical bore and a cylindrical counterbore, thrust-bearing means including spaced raceway members with antifriction elements therebetween, one of said raceway members being slidable in said bore, a pair of spaced roller assemblies riding on said counterbore as an outer raceway, annular spacer means axially spacing said roller assemblies, said housing member having an opening between said counterbore and the outside of said member and intermediate the axial ends of said spacer means, said spacer means being cut away at said opening, whereby the housing lug may project through said opening and into axial engagement with said cut-away portion.

8. In a bearing for use in a journal-box housing having an inwardly projecting axial locating lug, a sleeve member to be received in the box and of an axial length to provide on its inner surface raceways for two spaced sets of antifriction elements, said raceways being spaced at least by an amount equal to the axial extent of the lug, axial and angular abutment means on said sleeve member between said raceways for axial and angular locating abutment with the lug, a first sealing element in sealing relation with said inner surface and axially interposed between one set of antifriction elements and one axial side of the lug, and a second sealing element in sealing relation with said inner surface and axially interposed between the other set of antifriction elements and the other axial side of said lug.

9. In a bearing of the character indicated, a generally annular member with an inner cylindrical surface to fit a railway axle, a pair of spaced sets of antifriction rollers riding on the outside of said annular member, a housing member including a single cylindrical inner surface forming a raceway for each of said sets of rollers and having a slotted opening intermediate said sets of rollers for reception of a locating lug of a journal box, spacer means axially separating said sets of rollers, said spacer means including portions in sealing engagement with the cylindrical surface of said housing member on both axial sides of said opening, whereby said rollers may be sealed against the entrance of foreign matter through said opening.

10. In a bearing for use in a journal box having an inwardly projecting axial locating lug, a housing member having a continuous cylindrical inner surface and an opening from said surface to the outside of said housing for the locating reception of such a lug, two sets of antifriction rollers riding upon said surface as an outer raceway and located on opposite sides of said opening, there being a certain amount of axial freedom for axial sliding movement of said sets of rollers with respect to said housing member, said housing member being sufficiently thin so that such a lug may project radially inwardly of said surface, whereby such a lug may serve directly to limit axial movement of said sets of rollers independently of housing-member location.

FRANK NOE.

REFERENCES CITED

The following references are of record in the file of this patent:

UNITED STATES PATENTS

| Number | Name | Date |
|---|---|---|
| 1,921,882 | Horger | Aug. 8, 1933 |
| 1,921,883 | Horger | Aug. 8, 1933 |
| 2,133,024 | Gibbons | Oct. 11, 1938 |
| 2,176,244 | Brittain | Oct. 17, 1939 |
| 2,404,429 | Brittain | July 23, 1946 |
| 2,438,214 | Horger | Mar. 23, 1948 |